W. H. STEWART.
Bung.
No. 222,094. Patented Nov. 25, 1879.
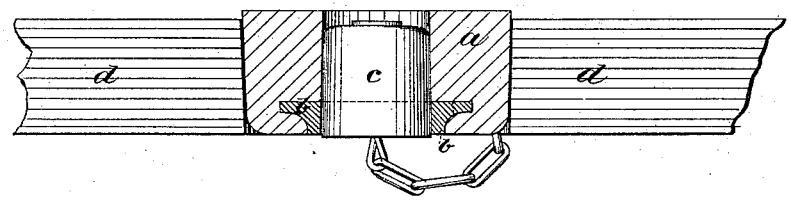
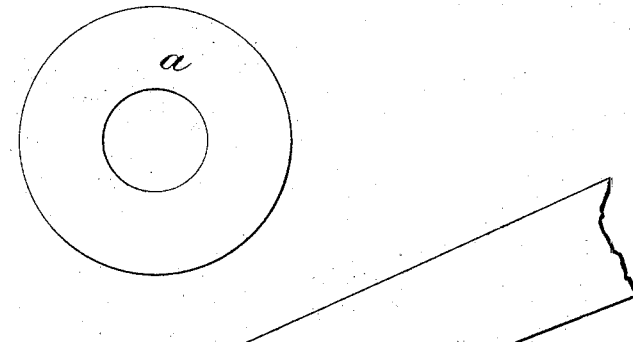
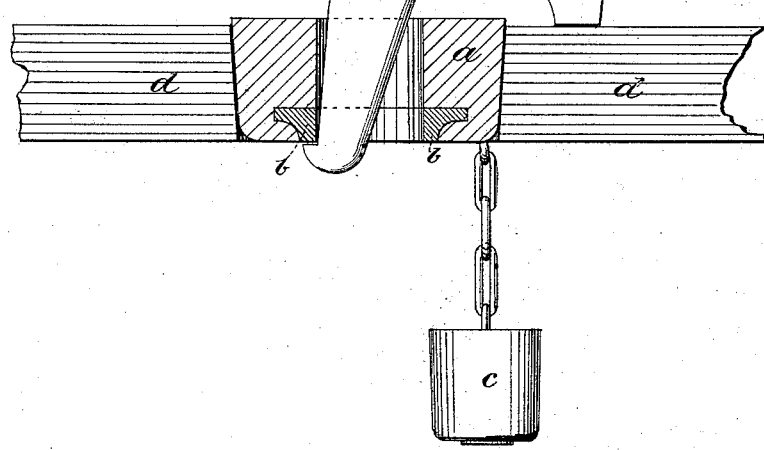
Witnesses: Inventor:
A. W. Almqvist William H. Stewart
L. H. Jemala

UNITED STATES PATENT OFFICE.

WILLIAM H. STEWART, OF BROOKLYN, NEW YORK.

IMPROVEMENT IN BUNGS.

Specification forming part of Letters Patent No. 222,094, dated November 25, 1879; application filed August 1, 1879.

*To all whom it may concern:*

Be it known that I, WILLIAM H. STEWART, of the city of Brooklyn, county of Kings, and State of New York, have invented a new and useful Improvement in Bungs for Casks and other vessels used for transporting liquids, which improvement is set forth in the following specification and accompanying drawings, in which—

Figure 1 is a vertical sectional view of the parts of the bung as they appear in actual use in a cask or barrel. $a$ represents the elastic bung, with an aperture inclosing a plug, $c$, inserted within the aperture of the bung. $b\ b$ represent a metallic plate or disk molded into or attached on the elastic bung. $d$ represents a section of the cask or barrel in which the bung is inserted when in use.

Fig. 2 represents a plan view of the elastic bung $a$ with aperture.

Fig. 3 is a sectional view of the bung $a$, the metallic plate or disk $b\ b$, the plug $c$, the cask $d$, and shows the method of extracting the bung from the cask or barrel by the hook $e$.

In making my improved elastic bung, I prefer to use rubber composition of the kind commonly used in making brewers' hose. The composition should contain no alkalies or other substances that will be affected by acids. Of this material I make an elastic bung having tapering longitudinal surfaces and lateral plane surfaces, similar in shape to the wooden bung commonly used, and of sufficient depth and diameter to fit closely within the bung-hole of the cask or barrel. Through the bung I have a vertical aperture of a size to admit the plug $c$—three-quarters of an inch I find to be sufficient for venting purposes.

The plug $c$ may be made of the same material as the bung, and may be attached to the bung by a link or any other suitable device.

In extracting bungs heretofore made of this composition from casks or barrels, the hook $e$, when in contact with the bung, chafes and tears the composition to an extent that it soon destroys the usefulness of the bung.

To avoid this evil is the object of my present invention. I construct a metallic plate or disk below the outer face, and within or attached to the bung, with one of its inner or lower surfaces exposed to receive the bearing of the hook, and to form a guard for protecting the bung from injury. This metallic plate may be made of any of the well-known metals, and may be molded in the composition when the bung is in process of manufacture, or may be attached by any suitable device, the object being to protect the composition from injury by contact with the extracting-hook.

In practical use I insert the plug $c$ within the aperture of the elastic bung, and then insert the bung $a$ within the aperture of the cask.

When the liquids are to be drawn off from the cask the plug $c$ is driven down and out of the bung into the cask, to give vent or admit air.

When the cask is to be refilled, the hook $e$ is inserted down through the aperture of the bung, and reaches under and rests against the metallic plate or disk $b\ b$ when the bung is withdrawn from the cask.

The advantages of my invention are cleanliness, economy, and convenience in using an elastic composition, and greater durability in using the metallic plate or disk in connection therewith, and is conspicuously useful for casks and barrels that are used repeatedly for the transportation of lager-beer, ales, &c.

My improved elastic bung with the metallic plate is practically indestructible, and may be used repeatedly for years, thus saving the cost of wooden bungs, which last only for a single use.

While I prefer to use rubber composition in making my elastic bung, I do not limit myself to that material alone. I may use any substance that is elastic, and make the bung of any desired shape or size. I may also make the metallic plate or disk of any desired shape suitable to obtain the results sought after.

Having thus described my invention, as aforesaid, I claim as my invention and desire to secure by Letters Patent—

An elastic bung having an aperture adapted in form to deliver a plug inwardly, and having a permanently-attached metallic guard bearing on its upper surface against the material of the bung, and having a portion of its under surface exposed, as and for the purpose set forth.

WILLIAM H. STEWART.

Witnesses:
 AUGTS. HAYWARD,
 C. B. RIDGWAY,
 WM. APGAR.